April 14, 1959  E. J. MILLER  2,881,552
FISHING BOBBER
Filed April 12, 1957

INVENTOR.
EDWARD J. MILLER
BY
ATTORNEY

United States Patent Office 2,881,552
Patented Apr. 14, 1959

2,881,552

FISHING BOBBER

Edward J. Miller, Okauchee, Wis.

Application April 12, 1957, Serial No. 652,503

2 Claims. (Cl. 43—44.91)

This invention relates to fishermen's accessories and more particularly to a new and improved bobber.

Heretofore floats or bobbers used when fishing with a rod have been provided with metal springs, clips, pins or clamps for clasping or releasing a fishing line used therewith. These line holding and releasing means are not only costly to provide on a float or bobber but soon lose their resiliency thereby substantially reducing or destroying the effectiveness of this floating structure.

Therefore, in accordance with the invention claimed a new and improved fishing bobber is provided which comprises a pair of cooperating parts which engage each other to form a water buoyant, and preferably spherical body. A dowel pin is attached to one of the parts to extend within an aperture in the other of the parts for holding the parts together to form the water buoyant body. The dowel pin is split longitudinally thereof for receiving a line when the parts are separated and for retaining or holding firmly the line within the split when the parts form the spherical body.

It is, therefore, one object of the present invention to provide a new and improved float or bobber.

Another object of this invention is to provide a new and improved bobber which can be quickly and easily applied to, released from and adjusted in a number of positions on a line.

A further object of this invention is to provide a new and improved bobber which grips the line firmly and centrally of the geometrical configuration of the bobber structure.

A still further object of this invention is to provide a new and improved bobber which will withstand an indefinite number of adjustments on a line and which is so simple in its construction as to be inexpensive to manufacture.

Other objects and advantages of this invention will become apparent from the following description when read in connection with the accompanying drawing, in which.

Figure 1:
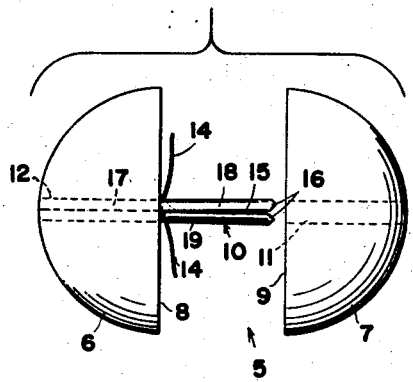
Fig. 1 is an exploded front view of the parts forming the fishing bobber and embodying the invention.
Figure 2:
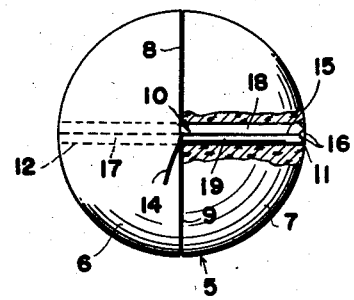
Fig. 2 is a front view partially in section of the parts illustrated in Fig. 1 in spherical forming position.
Figure 3:
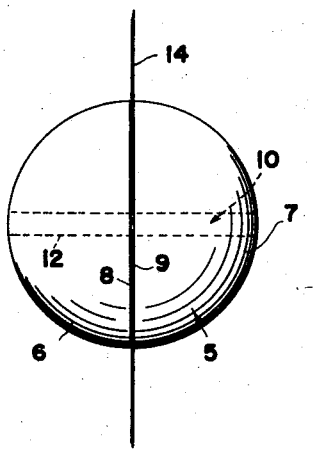
Fig. 3 is a top view of the fishing bobber illustrated in Fig. 2 illustrating the line in bobber clamping position.

Referring more particularly to the drawing by characters of reference, Figs. 1, 2 and 3 illustrate a float or bobber 5 formed of cork, wood, plastic or other suitable buoyant material which, for example, may have a spherical shape. Bobber 5 comprises two cooperating parts 6 and 7 which when combined to engage each other form a substantially closed solid figure or body preferably bounded by a curved surface, though it may assume other suitable shapes such as a cube. Parts 6 and 7 are provided with plane surfaces 8 and 9 respectively which are juxtapositioned in closely opposed face-to-face relation when the parts engage to form a spherical surface. In order to hold parts 6 and 7 together to form a sphere, means such as a dowel pin 10 is fastened to one of the parts and an aperture 11 is provided in the other of the parts for receiving the dowel pin. As shown in Figs. 1, 2 and 3 the dowel pin 10 is inserted in an aperture 12 in part 6 and suitably secured therein. Preferably the pin and aperture are relatively coaxially aligned on a diameter of the formed body although they can be arranged at other positions. Pin 10 extends out of surface 8 of part 6 a predetermined distance and when forced into aperture 11 in part 7 holds the parts together to form the float or bobber.

In order to fasten a fishing line 14 to the bobber structure dowel pin 10 is provided with a groove or split 15. The groove or split is shown in Figs. 1, 2 and 3 as extending longitudinally of the longitudinal axis of the pin from its outer or free end 16 thereof to its captured or sealed in end 17. As shown in Figs. 1, 2 and 3, dowel pin 10 comprises two flexible fingers 18 and 19 which combine to form the dowel pin structure, however, it is intended to cover by this invention a dowel pin formed in any shape or size which is split or grooved in such a manner longitudinally thereof to receive and clamp therein a fishing line.

As noted from Fig. 1 fingers 18 and 19 are separated from each other at their outer or free ends a greater distance than at their inner ends adjacent plane surface 8 when parts 6 and 7 are separated. This feature makes it possible to readily insert a fishing line within the groove or split between fingers 18 and 19. When the fishing line 14 is inserted between fingers 18 and 19 of dowel pin 10 and forced to lie adjacent to or across the plane surface 8 of part 6 dowel pin 10 is inserted into aperture 11 of part 7. When the free ends of fingers 18 and 19 are forced into aperture 11 in part 7 the fingers are forced tightly together to firmly grip or clamp line 14 therebetween. Aperture 11 in part 7 is of such a diameter that it forces fingers 18 and 19 together and holds them and parts 6 and 7 firmly together during the times parts 6 and 7 combine to form the spherical structure.

While parts 6 and 7 are combined together to form the spherical structure the line caught between fingers 18 and 19 is captured, however, line 14 may be readily released by merely separating the parts by pulling the dowel pin 10 out of aperture 11. Thus, the bobber formed by parts 6 and 7 may be easily applied to, released from or changed from one position to another on a fishing line without interference with any other equipment fastened to the fishing line.

Figure 4:
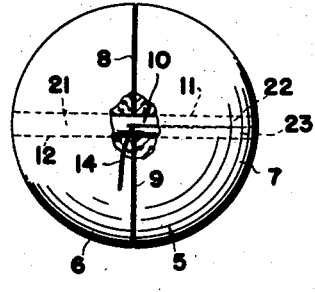
Fig. 4 is a view partially in section of a modification of the bobber structure illustrated in Figs. 1, 2 and 3 wherein the groove in the dowel pin extends only part way along its longitudinal axis.

Fig. 4 illustrates a modification of the bobber structure shown in Figs. 1, 2 and 3 wherein the dowel pin 21 is shown as a solid member grooved from the free end thereof to the surface 8 of part 6. The free end of pin 21 forms in a manner similar to Figs. 1, 2 and 3 a pair of flexible fingers 22 and 23 which readily receive and clamp a fishing line 14 therebetween. The fingers are inserted into aperture 11 in part 7 in the same manner as described above under the description of Figs. 1, 2 and 3.

Although but two embodiments of the present invention have been described, it will be apparent to those skilled in the art that various changes and modifications may be made therein without departing from the spirit of the invention or from the scope of the appended claims.

It is claimed and desired to secure by Letters Patent:

1. A fishing bobber comprising a pair of cooperating parts which engage each other along juxtapositioned surfaces to form a spherical body, one of said parts being provided with an aperture extending therein, a dowel pin attached to the other of said parts and slidably extending into said aperture in said one of said parts for holding said parts together to form said spherical body, said pin being split longitudinally thereof from its free end to the surface of said other of said parts to form a pair of flexible fingers, said fingers being separated from each other a greater distance at the free end of said pin than at the surface of said other of said parts when said parts are separated for receiving a line, said fingers clamping said line between said fingers at said juxtapositioned surfaces of said parts when said pin is inserted into said aperture of said other of said parts to form said spherical body.

2. A fishing bobber comprising a pair of cooperating parts which engage each other along juxtapositioned surfaces to form a spherical body, one of said parts being provided with an aperture extending therein, a dowel pin attached to the other of said parts and extending into said aperture in said one of said parts for holding said parts together to form said spherical body, said aperture and said pin being arranged substantially on a diameter of said body, said pin being split longitudinally thereof from its free end to the surface of said other of said parts to form a pair of flexible fingers, said fingers being separated from each other a greater distance at the free end of said pin than at the surface of said other of said parts when said parts are separated for receiving a line, said fingers clamping said line between said fingers at said juxtapositioned surfaces of said parts when said pin is inserted into said aperture of said other of said parts to form said spherical body.

References Cited in the file of this patent

UNITED STATES PATENTS

| | | |
|---|---|---|
| 418,995 | Tufts | Jan. 7, 1890 |
| 1,418,944 | Lower | June 6, 1922 |
| 2,481,346 | Rigby | Sept. 6, 1949 |
| 2,754,616 | Law | July 17, 1956 |
| 2,764,838 | Singer | Oct. 2, 1956 |